US012552059B2

(12) United States Patent
Crisp

(10) Patent No.: US 12,552,059 B2
(45) Date of Patent: Feb. 17, 2026

(54) RAZOR HANDLE

(71) Applicant: Edgewell Personal Care Brands, LLC, Chesterfield, MO (US)

(72) Inventor: Nicola Crisp, Hong Kong (HK)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 420 days.

(21) Appl. No.: 17/759,632

(22) PCT Filed: Jan. 22, 2021

(86) PCT No.: PCT/US2021/014489
§ 371 (c)(1),
(2) Date: Jul. 28, 2022

(87) PCT Pub. No.: WO2021/167744
PCT Pub. Date: Aug. 26, 2021

(65) Prior Publication Data

US 2023/0059613 A1 Feb. 23, 2023

Related U.S. Application Data

(60) Provisional application No. 62/978,880, filed on Feb. 20, 2020.

(30) Foreign Application Priority Data

Mar. 12, 2020 (EP) .................................... 20162579

(51) Int. Cl.
*B26B 21/52* (2006.01)

(52) U.S. Cl.
CPC ................................. *B26B 21/521* (2013.01)

(58) Field of Classification Search
CPC .............................. B26B 21/521; B26B 21/52
USPC .................................................... 30/526, 534
See application file for complete search history.

(56) References Cited

U.S. PATENT DOCUMENTS 4,702,004 A * 10/1987 Haythornthwaite .... B26B 21/58 30/526
5,403,534 A * 4/1995 Kim ...................... B26B 21/522 264/177.17
5,560,106 A 10/1996 Armbruster et al.
6,370,783 B1 * 4/2002 Bozikis ................. B26B 21/528 30/340
9,795,201 B2 * 10/2017 Barraclough .......... A45D 26/00
9,849,599 B2 * 12/2017 Gers-Barlag ........... B26B 21/52
(Continued)

FOREIGN PATENT DOCUMENTS

EP 1321250 A1 6/2003

OTHER PUBLICATIONS

International Search and Written Opinion issued in connection with PCT Application PCT/US2021/014489 dated Apr. 22, 2021.
(Continued)

*Primary Examiner* — Phong H Nguyen
(74) *Attorney, Agent, or Firm* — Edgar Rodriguez

(57) ABSTRACT

A razor handle has a head portion including a first end including a mechanism to permit a user to selectively connect a razor cartridge to the handle, and a second end defining a recess. A sleeve is secured in the recess. A grip portion has a proximal end secured in the sleeve. The grip portion consists essentially of glass.

16 Claims, 2 Drawing Sheets

(56) References Cited

U.S. PATENT DOCUMENTS

| | | | | |
|---|---|---|---|---|
| 2004/0138686 | A1* | 7/2004 | Hsu ........................ | A61B 17/32<br>606/167 |
| 2005/0229406 | A1* | 10/2005 | Lai ......................... | A47G 21/02<br>30/324 |
| 2019/0299474 | A1 | 10/2019 | Bourque et al. | |
| 2020/0061860 | A1 | 2/2020 | Ward | |

OTHER PUBLICATIONS

Unofficial English translation of the First Office Action issued by the State Intellectual Property Office of People's Republic of China on Mar. 21, 2025, in Chinese Patent Application No. 202180011625.6.

Unofficial Office Action issued Nov. 14, 2024, in Japanese Patent Application 2022-549853.

* cited by examiner

RAZOR HANDLE

BACKGROUND

1. Technical Field

The present disclosure relates to safety razors in general and, more particularly, to razor handles having grip portions manufactured from glass.

2. Background

Many modern so-called safety razors include a disposable razor cartridge (cartridge) adapted to be selectively connected to a reusable handle by connecting structure therebetween. Other so-called disposable razors are disposed of as an entire unit of a handle with connected cartridge. Many of these modern razor handles have a substantial "plastic" (i.e. thermopolymer or thermoplastic) content. There is a desire amongst some consumers to use less plastics materials for reasons of either or both reducing a so-called carbon footprint, and less microplastics entering the food chain. Consequently, there is a desire for manufacturers to provide products having a significantly reduced plastics content, and further comprising a substantial content of recyclable or sustainable materials. Glass is one such sustainable material that is readily understood by a consumer to easily and readily recycled. However, some common types of glass have physical performance limitations, e.g. a tendency to break upon impact.

SUMMARY

The present disclosure has for its objective to substantially alleviate the limitations of the prior art razor handles by providing a razor handle comprising a substantial proportion of glass. The handle has a head portion including a first end having a mechanism to permit a user to selectively connect a razor cartridge to the handle, and a second end defining a recess. A shock absorbing sleeve is secured in the recess. A grip portion has a proximal end secured in the sleeve. The grip portion consists essentially of glass.

In some aspects the proximal end is releasably secured in the sleeve. The proximal end can have an external thread matingly received in an internal thread of the sleeve. The external thread has 1.5-2.5 pitches (turns) at 3 mm pitch.

In other aspects of any preceding aspect, the glass is container glass and contains up to 75% recycled container glass. The sleeve can comprise a non-elastomeric polymer, preferably a semi-crystalline polymer having a flexural modulus in a range 800-2500 MPa, more preferably 1000-1500 MPa, and most preferably polypropylene. A shell of the head portion can comprise a relatively rigid material, e.g. die-cast zinc alloy.

In further aspects of any preceding aspect a distal end portion of the grip portion is hollow and has a wall thickness at least 3.5 mm.

The razor handle comprises a substantial proportion of a user-recognizable sustainable and recyclable material. The sleeve can absorb impact forces that might fracture the proximal end. The wall thickness can resist impact forces that might fracture the remaining portion(s) of the grip portion. The grip portion can be exchanged by a user.

The above features and advantages will be more fully understood with reference to the following detailed description when taken in conjunction with the accompanying drawings.

DETAILED DESCRIPTION

Figure 1:
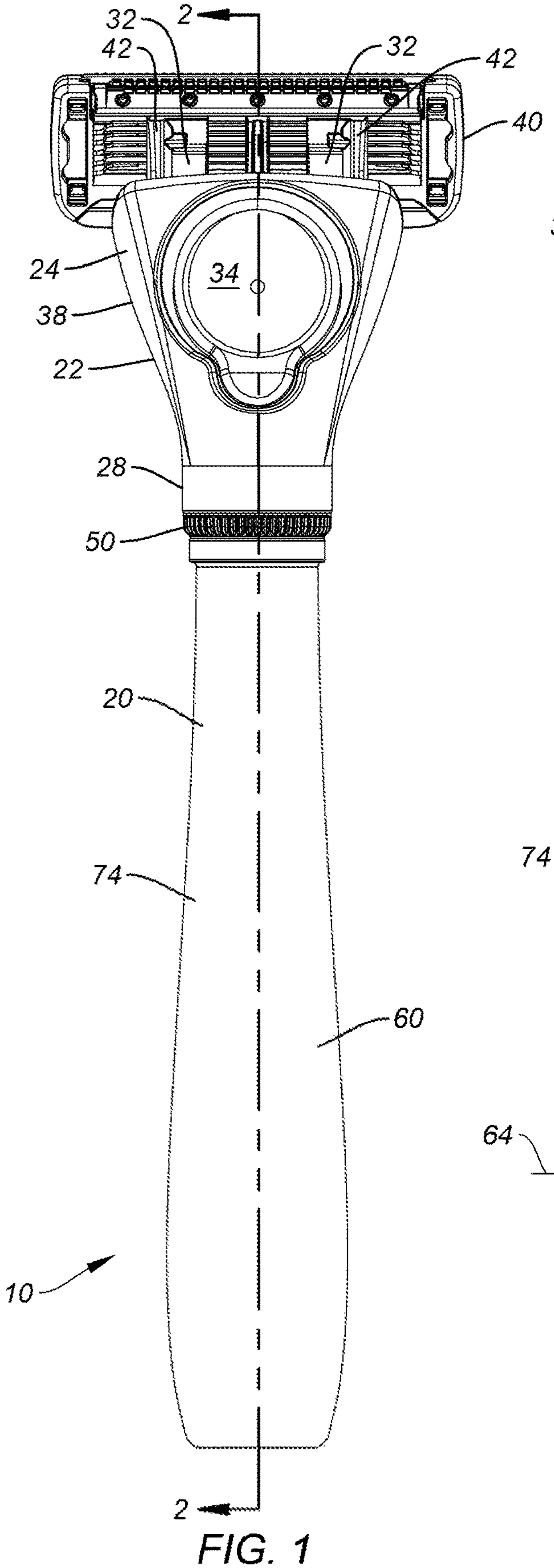
FIG. 1 is a view of a safety razor of the present disclosure.

In the context of the present disclosure, the term "glass" is intended to describe a non-crystalline (amorphous) solid comprising silica. Some common forms of "silicate" glass include: fused quartz, also called fused-silica glass; sodium borosilicate glass (e.g. PYREX™); lead-oxide glass, also called "crystal" glass; aluminosilicate glass; and also germanium-oxide glass. Another common type of glass is soda-lime-silica glass, also called window or flat glass. A slight variation of flat glass is so-called container glass, a soda-lime glass having more alumina and calcium, and less sodium and magnesium. In the present context an exemplary type of container is a bottle or jar. The preferred glass of the present disclosure is container glass and can include virgin glass, and up to 75% recycled, cleaned and high-temperature treated glass of the same type.

Referring now to the drawings, a safety razor 10 is depicted. The safety razor 10 comprises a handle 20 and a razor cartridge 40. The handle 20 comprises a head portion 22 having a first end 24 having a mechanism 26 to permit a user to selectively connect the razor cartridge 40 to the handle 20, and a second end 28 defining a recess 30 having a rim 31. The mechanism 26 can include arms 32 to engage mating structures 42 of the razor cartridge, e.g. to provide pivotal motion of the cartridge 40 relative to the handle 20. The mechanism 26 can also include an actuator button 34 to permit a user to release the razor cartridge 40 from the handle 20 to enable a new razor cartridge 40 to be connected to the handle 20. The shell 38 of the head portion 22 is preferably manufactured from a die-cast zinc alloy with a suitable aesthetic or protective coating.

A shock absorbing sleeve 50 is disposed in the recess 30. The sleeve 50 is preferably manufactured by injection molding a non-elastomeric polymer, e.g. a semi-crystalline polymer having a relatively high impact strength and a high stiffness, e.g. having a preferred flexural modulus in a range 800-2500 MPa (according to ASTM D790A), more preferably in a range 1000-1500 MPa. One suitable material is a polypropylene copolymer designated AV161 manufactured by SUMITOMO CHEMICAL. Elastomeric polymers having a relatively high stiffness (e.g. typically within the Shore D range) are acceptable.

Figure 2:
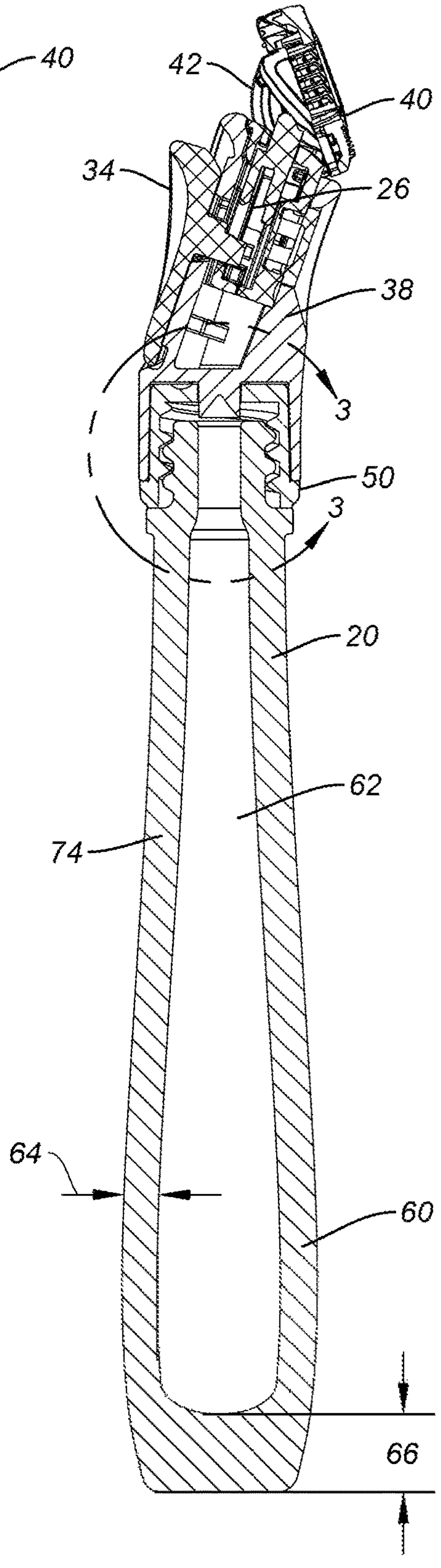
FIG. 2 is a sectional view taken at 2-2 in FIG. 1.
Figure 3:
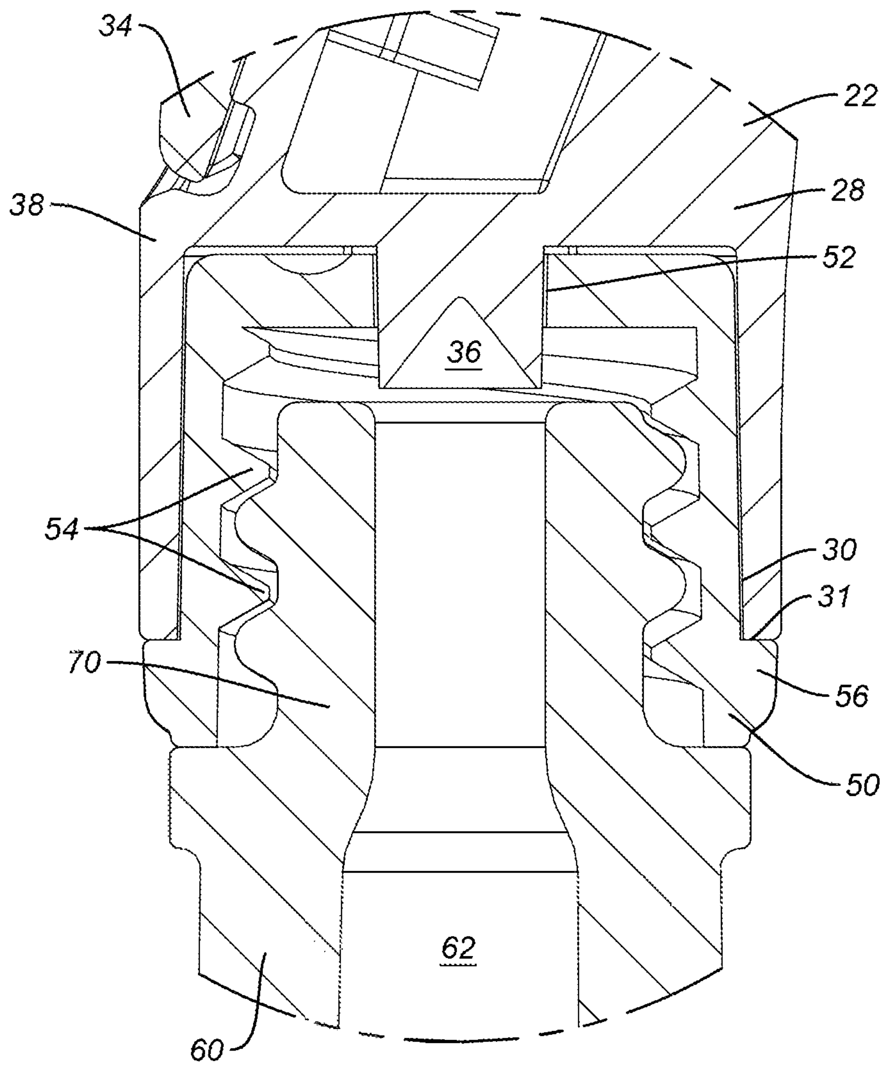
FIG. 3 is an enlarged portion "3" of FIG. 2.

The sleeve 50 is retained in the recess by suitably forming a rivet 36 of the second end 28 of the head portion 22. The rivet is received in a hole 52 of the sleeve 50 (and is shown in its pre-formed state in FIGS. 2 and 3). The sleeve 50 can be retained in the recess 30 by other suitable methods, such as by use of a suitable adhesive. A flange 56 of the sleeve 50 extends over the rim 31 of the recess 30.

The handle 20 also includes a grip portion 60. The grip portion 60 consists essentially of glass according to the preceding description, i.e. the grip portion 60 consists of glass but the glass can contain impurities and pigments. The specific gravity of glass is approximately 2.5. Given typical acceptable dimensions for a grip portion 60 that can be comfortably held by a user, and to avoid an unacceptable mass, a distal end portion 74 of the grip portion 60 preferably includes a hollow portion 62. The hollow portion 62 is preferably formed by blowing. Other grip portion 60 shapes are within the scope of this disclosure and these shapes (e.g.

rectangular, "W," "U," "Z" shaped in transverse cross section) can be suitably dimensioned to obviate the need for a hollow portion 62. A wall thickness 64 of the grip portion is preferably at least about 3.5 mm, in a range up to about 6 mm. A base thickness 66 of the grip portion 60 is preferably at least about 4.5 mm in a range up to about 10.5 mm. In manufacturing, the wall and base thickness 64, 66 can be estimated by determining the mass of the grip portion 60. E.g. if the mass is lower than a predetermined threshold it is likely the wall thickness is unsuitably thin.

A proximal end region 70 of the grip portion 60 is retained in the sleeve 50. Preferably the proximal end region 70 has an external screw thread form 72 received in mating internal thread form 54 of the sleeve 50. The thread forms of the connection between the proximal end region 70 and the sleeve 50 is preferably a so-called knuckle thread. The thread form can be a standard size according to (US) GPI (Glass Packaging Institute) standards, or DIN 168. The thread form can be a modification to a standard form having e.g. a different pitch or outside diameter. Preferably the external screw thread form 72 has 1.5-2.5 pitches (turns) at pitch 3 mm. The thread form can also have a different form.

The sleeve 50 is sufficiently rigid that a user experiences no loss of confidence as the grip portion 60 is not subjectively felt to flex in use relative to the head portion 22, especially since the shell 36 of the head portion 22 is also rigid to limit deflection of the sleeve 50. The sleeve 50 provides impact resistance (i.e. it is shock absorbing) to prevent fracture of the grip portion at the proximal end region 70. The wall and base thicknesses 64, 66 provide impact resistance in other regions of the grip portion 60. Since the grip portion has a screw-threaded attachment, it can be voluntarily removed by a user to be substituted by another grip portion of another e.g. shape, color, texture.

In other embodiments, the entire shell of the head portion can be manufactured from a suitable shock absorbing material, e.g. the AV161 material, the recess can be internally threaded, and the sleeve 50 can be omitted.

While various embodiments have been described above it should be understood that they have been presented by way of example only, and not limitation. For instance, modifications or changes as can be made within the scope of the attached claims and features disclosed in connection with any one embodiment can be used alone or in combination with each feature of the respective other embodiments. Thus, the breadth and scope of any embodiment should not be limited by any of the above described exemplary embodiments but should be defined only in accordance with the following claims and their equivalents.

What is claimed is:

1. A razor handle, comprising:

a head portion including a first end having a mechanism to permit a user to selectively connect a razor cartridge to the handle, and a second end defining a recess;

a shock absorbing sleeve secured in the recess and having an internal thread form; and a grip portion having a proximal end secured in the sleeve and an external thread form, the grip portion consists essentially of glass;

wherein the head portion is a separate component from the grip portion; and wherein the external thread form of the grip portion mates with the internal thread form of the shock absorbing sleeve.

2. The razor handle of claim 1, wherein the recess has a rim and a flange of the sleeve extends over the rim.

3. The razor handle of claim 1, wherein the grip portion is releasably secured in the sleeve.

4. The razor handle of claim 1, wherein the proximal end of the grip portion has an external thread, matingly received in an internal thread of the sleeve.

5. The razor handle of claim 4, wherein the external thread has 1.5 to 2.5 pitches.

6. The razor handle of claim 1, wherein the glass comprises container glass, and wherein the glass contains up to 75% recycled container glass.

7. The razor handle of claim 1, wherein a distal end portion of the grip portion includes a hollow portion and has a wall thickness at least 3.5 mm in a range up to 6 mm.

8. The razor handle of claim 1, wherein the sleeve comprises a non-elastomeric polymer.

9. The razor handle of claim 8, wherein the sleeve comprises a semi-crystalline polymer.

10. The razor handle of claim 8, wherein the sleeve has a flexural modulus in a range 800-2500 MPa.

11. The razor handle of claim 9, wherein the semi-crystalline polymer is polypropylene copolymer.

12. The razor handle of claim 10, wherein the flexural modulus is in a range 1000-1500 MPa.

13. A razor handle, comprising:

a head portion including a first end having a mechanism to permit a user to selectively connect a razor cartridge to the handle, and a second end defining a recess;

a shock absorbing sleeve secured in the recess and having an internal thread form, the shock absorbing sleeve having a flexural modulus in a range 800-2500 MPa; and a grip portion having a proximal end secured in the sleeve and an external thread form;

wherein the head portion is a separate component from the grip portion; and wherein the external thread form of the grip portion mates with the internal thread form of the shock absorbing sleeve.

14. The razor handle of claim 13, wherein the grip portion consists essentially of glass.

15. The razor handle of claim 13, wherein the grip portion is releasably secured in the sleeve.

16. The razor handle of claim 13, wherein the grip portion comprises a hollow portion at least partially surrounded by a wall and a base, the wall having a wall thickness of between about 3.5 mm and about 6 mm, the base having a base thickness of between about 4.5 mm and about 10.5 mm.

* * * * *